Figure 1:
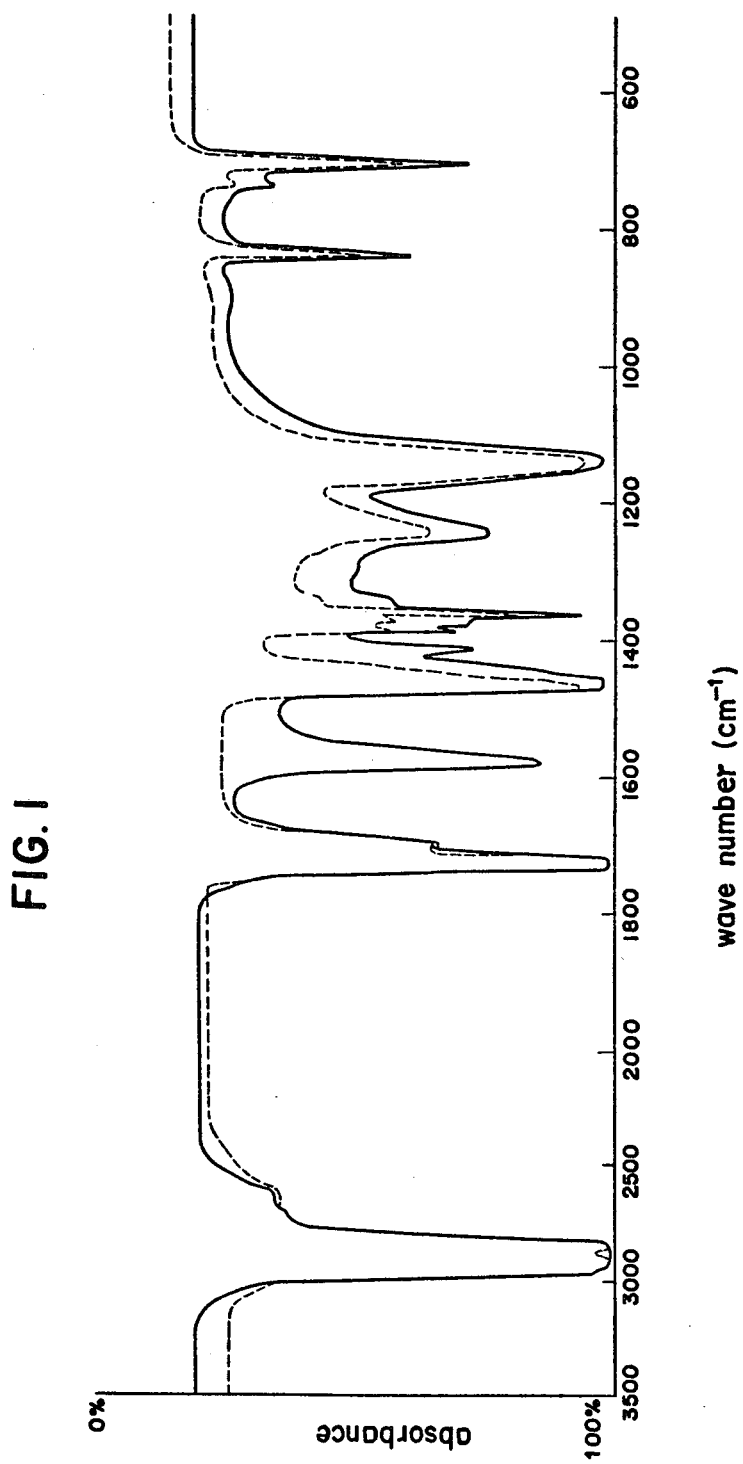

United States Patent [19]

Tatsukami et al.

[11] 4,042,766
[45] Aug. 16, 1977

[54] METHOD FOR PREPARATION OF IONICALLY CROSSLINKED ETHYLENE COPOLYMERS

[75] Inventors: Yoshiharu Tatsukami; Mitsuyuki Okada; Tsutomu Takahashi, all of Niihama, Japan

[73] Assignee: Sumitomo Chemical Company, Limited, Osaka, Japan

[21] Appl. No.: 668,242

[22] Filed: Mar. 18, 1976

[30] Foreign Application Priority Data

Mar. 18, 1975  Japan .................................. 50-33206

[51] Int. Cl.² ............................ C08F 8/42; C08F 8/00
[52] U.S. Cl. ........................................ 526/47; 526/16; 526/48
[58] Field of Search .............................. 526/16, 47, 48

[56] References Cited

U.S. PATENT DOCUMENTS

| | | | |
|---|---|---|---|
| 3,264,272 | 10/1966 | Rees | 260/78.5 |
| 3,322,734 | 5/1967 | Rees | 526/47 |
| 3,404,134 | 10/1968 | Rees | 526/47 |
| 3,789,035 | 1/1974 | Iwami et al. | 526/47 |

Primary Examiner—William F. Hamrock
Attorney, Agent, or Firm—Birch, Stewart, Kolasch and Birch

[57] ABSTRACT

A method for preparation of ionically crosslinked ethylene copolymers having excellent physical properties, which comprises melt blending a copolymer of (a) ethylene and (b) an α,β-ethylenically unsaturated carboxylic acid ester selected from the group consisting of isopropyl acrylate, isopropyl methacrylate, tert-butyl acrylate and tert-butyl methacrylate with (c) a metal compound selected from the group consisting of the acetates, formates and oxides of the metals having 1 to 3 valences in Groups I, II, III, IV-A and VIII of the Periodic Table, and keeping the resulting molten blend at a temperature of 200° to 320° C to give in one step an ionically crosslinked ethylene copolymer which comprises the monomer unit components of the formulae:

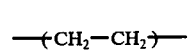

[W]

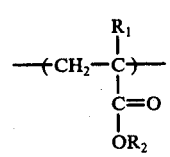

[X]

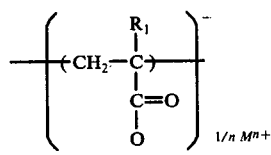

[Y]

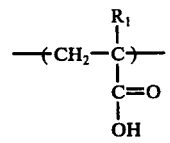

[Z]

wherein $R_1$ is a hydrogen atom or a methyl group, $R_2$ is an isopropyl group or a tert-butyl group, M is a metal atom having 1 to 3 valences in Groups I, II, III, IV-A and VIII of the Periodic Table and $n$ is an integer corresponding to the valence of the metal represented by M in a molar proportion of $w : x : y : z$ which satisfy the relationships of the equations:

$$\frac{x + y + z}{w + x + y + z} \times 100 = 0.5 - 25 \quad (1)$$

$$\frac{y}{x + y + z} \times 100 = 10 - 70 \quad (2)$$

wherein either one of $x$ and $z$ can be zero.

2 Claims, 1 Drawing Figure

METHOD FOR PREPARATION OF IONICALLY CROSSLINKED ETHYLENE COPOLYMERS

The present invention relates to a method for preparation of ionically crosslinked ethylene copolymers. More particularly, it relates to a method for the one step production of ionically crosslinked ethylene copolymers having excellent physical properties with a high efficiency.

There have heretofore been known various methods for preparation of copolymers of ethylene and acrylic or methacrylic acid from copolymers of ethylene and an acrylic or methacrylic ester by pyrolysis of the ester linkage in the latter [cf. Japanese Patent Publication Nos. 12742/1971 and 21643/1971].

Different from such known methods wherein the pyrolysis of the ester linkage is substantial, the attempt of the present invention is directed to the production of an ionically crosslinked ethylene copolymer by melt blending a copolymer of ethylene and an α,β-ethylenically unsaturated carboxylic acid ester (hereinafter referred to as "ester copolymer") with a metal compound, wherein "ionic crosslinking" is the major reaction. This ionic crosslinking is competitive with the pyrolysis of the ester linkage and the heat cleavage of the polymer chain, and it has now been found that, among them, the ionic crosslinking can proceed predominantly under certain specific conditions. This invention is based on this finding.

According to the present invention, there is provided a method for preparation of ionically crosslinked ethylene copolymers which comprises melt blending a copolymer comprising as the essential monomer unit components (a) ethylene and (b) at least one α,β-ethylenically unsaturated carboxylic acid ester selected from the group consisting of isopropyl acrylate, isopropyl methacrylate, tert-butyl acrylate and tert-butyl methacrylate with (c) at least one metal compound selected from the group consisting of the acetates, formates and oxides of the metals having 1 to 3 valences in Groups I, II, III, IV-A and VIII of the Periodic Table, and keeping the resulting molten blend at a temperature of about 200° to 320° C to give in one step an ionically crosslinked ethylene copolymer which comprises the monomer unit components of the formulae:

$$-(CH_2-CH_2)- \quad [W]$$

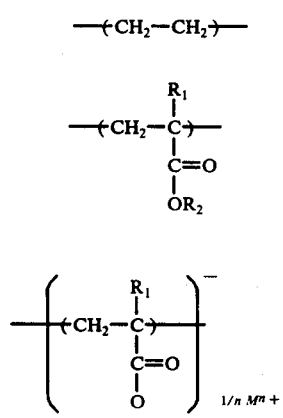

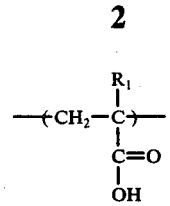

wherein $R_1$ is a hydrogen atom or a methyl group, $R_2$ is an isopropyl group or a tert-butyl group, M is a metal atom having 1 to 3 valences in Groups I, II, III, IV-A and VIII of the Periodic Table and n is an integer corresponding to the valence of the metal represented by M in a molar proportion of $w : x : y : z$ which satisfy the relationships of the equations:

$$\frac{x+y+z}{w+x+y+z} \times 100 = 0.5 - 25 \quad (1)$$

$$\frac{y}{x+y+z} \times 100 = 10 - 70 \quad (2)$$

wherein either one of $x$ and $z$ can be zero.

In the ionically crosslinked ethylene copolymer, the monomer unit components may be linked in a straight or branched state and also in a block, random or graft configuration. The monomer unit components [W], [X], [Y] and [Z] are respectively the unit of ethylene, the unit of isopropyl acrylate, isopropyl methacrylate, tert-butyl acrylate or tert-butyl methacrylate, the unit of the metal salt of acrylic acid or methacrylic acid formed as the result of the ionic crosslinking and the unit of acrylic acid or methacrylic acid formed as the result of the pyrolysis of the ester linkage.

Hitherto, there has been known a method for preparation of an ionically crosslinked ethylene copolymer, which comprises reacting a copolymer of ethylene and an α,β-ethylenically unsaturated carboxylic acid (hereinafter referred to as "acid copolymer") as the copolymer base with a metal compound which is able to ionize the acid copolymer [cf. U.S. Pat. No. 3,264,272 and Japanese Patent Publication No. 6810/1964]. The acid copolymer is, as known in the related art field, prepared by polymerizing ethylene with an α,β-ethylenically unsaturated carboxylic acid in the presence or absence of an inert solvent using a radical initiator, usually under a high pressure. Under such condition, the acid is very corrosive and may afford a great damage to the reaction equipment, particulary when the reaction operation is carried out continuously. Additionally, the content of the unit of the acid in the acid copolymer is disadvantageously limited by the insufficient solubility of the acid into the liquid medium used in the polymerization. In the present invention, the copolymer base is the ester copolymer obtainable by polymerization of ethylene with a certain α,β-ethylenically unsaturated carboxylic acid ester, which is substantially non-corrosive.

There has also been known a method for production of an ionically crosslinked ethylene copolymer by the use of the ester copolymer as the copolymer base. In such known method, however, the ester copolymer is first hydrolyzed to the corresponding acid copolymer, which is then neutralized to give the ionically crosslinked ethylene copolymer. Thus, ionic crosslinking as in the present invention is not utilized.

The ester copolymer to be used as the copolymer base in the present invention is the one comprising as the essential monomer unit components ethylene and at least one α,β-ethylenically unsaturated carboxylic acid ester selected from the group consisting of isopropyl acrylate, isopropyl methacrylate, tert-butyl acrylate and tert-butyl methacrylate. It may comprise additionally one or more other ethylenically unsaturated monomers as the optional monomer unit component(s). The preparation of the ester copolymer may be accomplished in a conventional manner.

The metal compound may be chosen from the acetates, formates and oxides of the metals having 1 to 3 valences in Groups I, II, III, IV-A and VIII of the Periodic Table, which do not take part of the heat cleavage of the polymer chain or do prevent such heat cleavabe and are effective in ionic crosslinking. Preferred are the compounds of the metals belonging to Group I or II of the Periodic Table such as zinc, magnesium, calcium and sodium. Among the metal compounds, particularly preferred are acetates.

In order to assure the excellent properties of the ethylenically crosslinked ethylene copolymer in the solid state and also in the melt flow state, the ester copolymer and the metal compound should be used in such amounts as the afford the ionically crosslinked ethylene copolymer wherein the monomer unit components [W], [X], [Y], and [Z] satisfy the relationships of the equations (1) and (2). When the value in the equation (1) is less than 0.5, the tensile strength and the adhesive bond strength are not satisfactory. Even if it is more than 25, any further improvement is not attained, thus resulting in an economical disadvantage. In General, the value of the equation (1) is preferred to be between 3 and 10. In the case of the value in the equation (2) is less than 10, the tensile strength and the adhesive bond strength are not sufficient. In case of more than 70, gelation largely proceeds, thus reducing unfavorably the melt flow property at high temperatures.

As stated above, the ionic crosslinking is competitive with the pyrolysis of the ester linkage and the heat cleavage of the polymer chain. Fortunately, the ionic crosslinking can proceed with a much higher reaction rate than that of the pyrolysis of the ester linkage at low temperatures, at which the heat cleavage of the polymer chain is suppressed. Thus, the ester copolymer and the metal compound are melt blended, and the resulting molten blend is kept at a temperature of about 200° to 320° C, whereby the ionic crosslinking proceeds predominantly with a satisfactorily high reaction rate. it is advantageous that, under such temperature condition, the low molecular weight compounds by-produced on the ionic crosslinking are removed from the reaction mixture in a molten state, thus giving no damage to the reaction equipment.

As the reaction equipment for carrying out the present invention, it is desirable to use the one having a high mixing efficiency so as to assure the uniform dispersion of the metal compound into the ester copolymer and the quick evaporation of the low molecular weight compounds by-produced in the ionic crosslinking. The uniform dispersion of the metal compound may be also achieved by using it in the form of a master batch, or by effecting continuously the melt blending and the ionic crosslinking.

The metal compound blended into the ester copolymer may perfect the ionic crosslinking within about one to two minutes.

The degree of the ionic crosslinks for obtaining the favorable properties depends on the content of the α,β-ethylenically unsaturated carboxylic acid ester, the melt index of the ester copolymer, the temperature of the ionic crosslinking, the kind of the metal compound, etc. Thus, the desired degree of the ionic crosslinks can be achieved by controlling these factors appropriately.

As understood from FIG. 1 in the accompanying drawing which shows the IR absorption spectra of the ionically crosslinked ethylene copolymer obtained in Example 1 according to the present invention (indicated by a solid line) and of the corresponding ethylene copolymer obtained by treating as in Example 1 but using no metal compound (indicated by a broken line), the ionic crosslinking proceeds predominantly in the present invention. Therefore, the content of the metal salt of the α,β-ethylenically unsaturated carboxylic acid can be determined from the change of the absorption bands in the IR absorption spectra.

When desired, the thus obtained ionically crosslinked ethylene copolymer may be blended with additives such as stabilizers, pigments and fillers.

The ionically crosslinked ethylene copolymer of the invention has a controlled crosslinkability (ionic crosslinkability) and can be widely used in the fields of laminated structures including coated materials and safety glass, hot-melt type adhesives and films. Also, the copolymer has properties which are very suitable for the preparation of food-packaging films.

The present invention will be illustrated more specifically with reference to the following examples which are not however to be interpreted as limiting the invention thereto. In these examples, parts are by weight, and the melt index, yield strength, tensile strength and elongation were measured according to JIS (Japanese Industrial Standard) K 6760-1971.

EXAMPLE 1

100 Parts of ethylene/tert-butyl acrylate copolymer (tert-butyl acrylate content, 7.0% by mole; melt index, 130 g/10 min; yield strength, 23 kg/cm$^2$, tensile strength, 25 kg/cm$^2$; elongation, 50%) were milled with 35 parts of zinc acetate to prepare a master batch. The master batch and the said copolymer were blended so as to make a concentration of zinc acetate of 20% by mole based on the tert-butyl acrylate content. The resulting blend was extruded through a 20 mm $\phi$ extruder at an ionic crosslinking temperature of 220° C under atmospheric pressure. The retention time in the extruder was about 1 minute.

As is apparent from the IR absorption spectrum shown in FIG. 1 of the accompanying drawing, the resulting polymer was quadripolymer comprising ethylene, the metal salt of acrylic acid, unreacted tert-butyl acrylate and a trace amount of acrylic acid. the physical properties of the polymer are shown in Table 1, from which it is understood that the polymer has properties much superior to those of the starting material.

EXAMPLES 2 and 3

The ionic crosslinkings were carried out in the same manner as in example 1 except that the ionic crosslinking temperatures were 240° C in Example 2 and 280° C in Example 3. In case of Example 3, the resulting polymer was found to be a terpolymer comprising ethylene, the metal salt of acrylic acid and acrylic acid on the basis of the IR absorption spectrum. The physical properties of the polymers are shown in Table 1.

EXAMPLES 4, 5 and 6

The ionic crosslinkings were carried out in the same manner as in Example 1 except that ethylene/tert-butyl acrylate copolymers having different tert-butyl acrylate contents and melt indexes were used, and that magnesium acetate, sodium formate and zinc oxide were used as the metal compounds. The physical properties of the polymers are shown in Table 1.

EXAMPLES 7 and 8

The ionic crosslinkings were carried out in the same manner as in Example 1 except that an ethylene/isopropyl methacrylate copolymer was used as the copolymer base, and that the ionic crosslinking temperatures were 270° C in Example 7 and 300° C in Example 8. The physical properties of the polymers are shown in Table 1.

EXAMPLE 9

The ionic crosslinking was carried out in the same manner as in Example 1 except that an ethylene/tert-butyl methacrylate copolymer was used as the copolymer base and zinc formate was employed as the metal compound, and that the ionic crosslinking temperature was 250° C. The physical properties of the polymer are shown in Table 1.

EXAMPLE 10

The ionic crosslinking was carried out in the same manner as in Example 1 except that an ethylene/tert-butyl methacrylate copolymer was used as the copolymer base, and that the ionic crosslinking temperature was 280° C. The physical properties of the polymer are shown in Table 1.

dium, and maintaining the resulting molten blend at a temperature of about 200° to 320° C to give in one step an ionically crosslinked ethylene copolymer which comprises the monomer unit components of the formulae:

   [W]

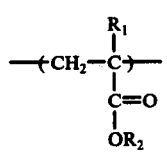   [X]

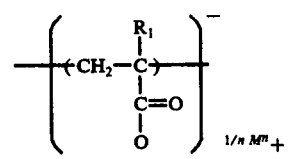   [Y]

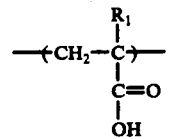   [Z]

wherein $R_1$ is a hydrogen atom or a methyl group, $R_2$ is an isopropyl group or a tert-butyl group, M is a metal atom from said metal compound (c), and $n$ is an integer corresponding to the valence of the metal represented by M in a molar proportion of $w:x:y:z$ which satisfy the relationships of the equations:

Table 1

| Example No. | Copolymer base | | | Metal compound | | Ionic cross-linking temperature (° C) | Physical properties of polymer | | | |
|---|---|---|---|---|---|---|---|---|---|---|
| | Comonomer | | Melt index (g/10 min) | | Amount added*2) | | Melt index (g/10 min) | Yield strength (kg/cm²) | Tensile strength (kg/cm²) | Elongation (%) |
| | Kind | Content*1) (% by mole) | | Kind | % by mole based on the comonomer | | | | | |
| 1 | Tert-butyl acrylate | 7.0 | 130 | Zinc acetate | 20 | 220 | 17 | 95 | 275 | 470 |
| 2 | Tert-butyl acrylate | 7.0 | 130 | Zinc acetate | 20 | 240 | 9 | 130 | 348 | 450 |
| 3 | Tert-butyl acrylate | 7.0 | 130 | Zinc acetate | 20 | 280 | 4 | 162 | 430 | 400 |
| 4 | Tert-butyl acrylate | 7.2 | 145 | Magnesium acetate | 15 | 250 | 11 | 117 | 330 | 450 |
| 5 | Tert-butyl acrylate | 6.3 | 105 | Sodium formate | 25 | 240 | 6 | 145 | 362 | 410 |
| 6 | Tert-butyl acrylate | 6.3 | 105 | Zinc oxide | 15 | 230 | 21 | 95 | 230 | 465 |
| 7 | Isopropyl methacrylate | 8.1 | 200 | Zinc acetate | 31 | 270 | 7 | 130 | 305 | 420 |
| 8 | Isopropyl methacrylate | 8.1 | 200 | Zinc acetate | 31 | 300 | 3 | 147 | 380 | 400 |
| 9 | Tert-butyl methacrylate | 5.6 | 90 | Zinc formate | 17 | 250 | 9 | 125 | 342 | 400 |
| 10 | Tert-butyl methacrylate | 5.6 | 90 | Zinc acetate | 15 | 280 | 3 | 156 | 383 | 390 |

Note:
*1)Comonomer content (mole %) is equal to $\frac{x+y+z}{w+x+y+z} \times 100$.

*2)Amount of metal compound (mole %) × valence of the metal is equal to $\frac{y}{x+y+z} \times 100$.

What is claimed is:

1. A method for preparation of ionically crosslinked ethylene copolymers, which comprises melt blending a copolymer comprising as the essential monomer unit components (a) ethylene and (b) at least one $\alpha,\beta$-ethylenically unsaturated carboxylic acid ester selected from the group consisting of isoproyl acrylate, isopropyl methacrylate, tert-butyl acrylate and tert-butyl methacrylate with (c) at least one metal compound selected from the group consisting of the acetates, formates and oxides of zinc, magnesium, calcium and so- $$\frac{x+y+z}{w+x+y+z} \times 100 = 3 \text{ to } 10$$

$$\frac{y}{x+y+z} \times 100 = 10 \text{ to } 70$$

wherein either one of x and z can be zero.

2. The method according to claim 1 wherein the metal compound is an acetate.

* * * * *